United States Patent
Kobayashi et al.

(10) Patent No.: US 7,004,591 B2
(45) Date of Patent: Feb. 28, 2006

(54) ANTIFOGGING ELEMENT AND METHOD FOR FORMING THE SAME

(75) Inventors: Masaki Kobayashi, Shizuoka (JP); Norihiko Kuzuya, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 341 days.

(21) Appl. No.: 10/344,582

(22) PCT Filed: Jun. 11, 2001

(86) PCT No.: PCT/JP01/04908

§ 371 (c)(1),
(2), (4) Date: Feb. 13, 2003

(87) PCT Pub. No.: WO02/100634

PCT Pub. Date: Dec. 19, 2002

(65) Prior Publication Data

US 2004/0095660 A1 May 20, 2004

(51) Int. Cl.
| | |
|---|---|
| *G02B 1/00* | (2006.01) |
| *B05D 1/00* | (2006.01) |
| *B05D 3/02* | (2006.01) |
| *B05D 5/04* | (2006.01) |
| *B32B 5/18* | (2006.01) |
| *B32B 5/22* | (2006.01) |
| *B32B 17/06* | (2006.01) |
| *C03C 17/25* | (2006.01) |

(52) U.S. Cl. .......... 359/507; 359/884; 427/162; 427/163.1; 427/372.2; 428/432; 428/699

(58) Field of Classification Search ............ 359/507, 359/884; 428/432, 469, 697, 699, 701, 702; 427/162, 163.1, 164, 165, 372.2

See application file for complete search history.

(56) References Cited

U.S. PATENT DOCUMENTS

| | | | |
|---|---|---|---|
| 5,854,708 A | 12/1998 | Komatsu et al. | 359/512 |
| 6,099,969 A | * 8/2000 | Ogata | 428/432 |

(Continued)

FOREIGN PATENT DOCUMENTS

| | | |
|---|---|---|
| EP | 820967 | 1/1998 |
| EP | 846494 | 6/1998 |

(Continued)

OTHER PUBLICATIONS

Japanese Patent Application Publication No. JP 2000–01668, filed Jul. 1, 1998, with English Abstract. with machine–assisted translation.

*Primary Examiner*—John Juba, Jr.
(74) *Attorney, Agent, or Firm*—Oblon, Spivak, McClelland, Maier & Neustadt, P.C.

(57) ABSTRACT

A coating agent including photocatalyst particles dispersed in a titanium peroxide solution obtainable by causing titanium hydroxide (orthotitanic acid) gel to act with hydrogen peroxide being used as a material for the photocatalyzer film is used to a photocatalyzer film having photocatalyst particles supported therein. By forming a porous hydrophilic substance film on the photocatalyzer film, the defects of the film caused by the wiping can be prevented. Also, a film formed by using the coating agent including photocatalyst particles dispersed in a titanium peroxide solution at a temperature of from normal room temperature to 200° C. is of high porosity in comparison with a film formed at a higher temperature and with a film not having a photocatalyst particles dispersed therein. Consequently, the photocatalyzer film and the hydrophilic substance film have good adhesion property when use with each other.

8 Claims, 6 Drawing Sheets

U.S. PATENT DOCUMENTS

| | | | |
|---|---|---|---|
| 6,107,241 A * | 8/2000 | Ogata et al. | 502/350 |
| 6,165,256 A * | 12/2000 | Hayakawa et al. | 106/13 |
| 6,185,034 B1 * | 2/2001 | Nakamura et al. | 359/265 |
| 6,193,378 B1 * | 2/2001 | Tonar et al. | 359/603 |
| 6,235,401 B1 * | 5/2001 | Ogata et al. | 428/472 |
| 6,576,344 B1 * | 6/2003 | Doushita et al. | 428/426 |
| 6,645,460 B1 * | 11/2003 | Sakatani et al. | 423/608 |
| 2002/0042343 A1 * | 4/2002 | Akui et al. | 502/350 |

FOREIGN PATENT DOCUMENTS

| | | |
|---|---|---|
| EP | 1 099 671 | 5/2001 |
| JP | 09-071418 A * | 3/1997 |
| JP | 09-262481 A * | 10/1997 |
| JP | 10-067516 A * | 3/1998 |
| JP | 10-297436 | 11/1998 |
| JP | 2000-264680 | 9/2000 |
| JP | 2000-290779 | 10/2000 |
| JP | 2000-317388 | 11/2000 |

* cited by examiner

| Photocatalyzer Film | | Hydrophilic Substance Film | Film Structure | Test for Defective Resistance | | |
|---|---|---|---|---|---|---|
| Photocatalyzer | Conjugation Material | | | 500 Times | 1500 Times | 2500 Times |
| Anatase Type TiO$_2$ | Amorphous SiO$_2$ | Not Formed | Amorphous SiO$_2$ / Anatase Type TiO$_2$ | Poor | Poor | Poor |
| Anatase Type TiO$_2$ | Amorphous SiO$_2$ | Formed | Hydrophilic Substance Film / Amorphous SiO$_2$ / Anatase Type TiO$_2$ | Good | Good | Good |

ANTIFOGGING ELEMENT AND METHOD FOR FORMING THE SAME

TECHNICAL FIELD

This invention relates to an anti-fog element comprising a substrate, a photocatalyzer film formed on the surface of the substrate, and a hydrophilic substance film formed on the surface of the film in a porous state, and to a process for forming the anti-fog element. Particularly, it relates to an anti-fog element having enhanced film strength against defects and good film adhesion properties, and process for forming the same.

BACKGROUND ARTS

International Patent Publication WO96/29375 discloses a process for producing an anti-fog element by supporting anatase type $TiO_2$ film particles having a photocatalytic property on a conjugation material such as silica to obtain the anti-fog element at a low temperature of from normal room temperature to 150° C. Specifically, a suspension including anatase type $TiO_2$ (titania) particles or rutile type $TiO_2$ (titania) particles and silica ($SiO_2$) particles is applied onto the surface of a substrate to form a photocatalyzer film comprising silica-formulated titania. By applying a mixture of an amorphous silica precursor such as tetraalkoxysilane, silanol or polysiloxane, with crystalline titania sol onto the surface of a substrate, optionally carrying out hydrolysis to form silanol, and then heating the system at a temperature of not less than 100° C. to perform the dehydration polycondensation of silanol, a photocatalyzer film having titania bonded to amorphous silica is formed.

However, since the photocatalyzer film just mentioned comprises the anatase type $TiO_2$ fine particles supported only by the adhesion force to the silica film, the $TiO_2$ fine particles are apt to be exfoliated from the surface of the film only by wiping and they injure the film.

SUMMARY OF THE INVENTION

According to the present invention, a photocatalyzer film is formed by using a coating agent comprising photocatalyst particles dispersed in a titanium peroxide solution obtained by causing titanium hydroxide (orthotitanic acid) gel to act with hydrogen peroxide. It has been found that the surface of the photocatalytic surface is defected by wiping. It has also been found that the formation of a porous hydrophilic substance this photocatalyzer film can prevent the defects caused by the wiping and enhances an anti-fog performance. A film formed by using the coating agent comprising photocatalyst particles dispersed in a titanium peroxide solution at a temperature of from normal room temperature to 200° C. is of high porosity in comparison with a film formed at a higher temperature and with a film not having a photocatalyst particles dispersed therein. Consequently, it has been proven that the photocatalyzer film and the hydrophilic substance film have good adhesion property when use each other.

BEST MODES FOR CARRYING OUT THE INVENTION

The present invention is directed to an anti-fog element comprising a substrate, a photocatalyzer layer formed on the surface of the substrate, and a hydrophilic film formed thereon, in a porous state, characterized by using a coating agent comprising photocatalyst particles dispersed in a titanium peroxide solution obtainable by causing titanium hydroxide (orthotitanic acid) gel to act with hydrogen peroxide as a material for the photocatalyzer film.

Generally, a titanium peroxide solution is a sol solution of an amorphous type titanium dioxide obtainable by causing a titanium peroxide gel (orthotitanic acid) in a gel form to act with hydrogen peroxide. The titanium peroxide solution, which consists essentially of titanium, oxygen, and hydrogen, is highly pure.

Methods for forming a film using the coating agent comprising photocatalyst particles dispersed in a titanium peroxide solution include spin coating, dip coating, spray coating, roll coating, flow coating, and the like.

From the coating agent comprising photocatalyst particles dispersed in a titanium peroxide solution, a photocatalyzer film having the photocatalyst particles dispersed in the amorphous titanium film can be formed by forming a film flowed by drying.

The temperature of the heat treatment is preferably in the range of from normal room temperature up to 200° C., more preferably from normal room temperature up to 150° C., and still more preferably from normal room temperature to approximately 100° C. It can be considered that by the heat treatment at a low temperature ranging from normal room temperature to approximately 100° C., since the photocatalyzer film has a high porosity in comparison with one which is treated at a higher temperature, and since many more OH groups are present in the photocatalyzer film, the bonding between the photocatalyzer film and the hydrophilic substance film becomes stronger. The heat treatment can be carried out during the course of the stage of applying the coating agent, after the application, or both during the course of and after the application stage.

As used herein, the term "photocatalyst particles" means fine particles of a material, which exhibit catalytic function upon being exposed to a light. Most preferable photocatalyst particles are anatase type $TiO_2$ particles prepared from a titanium peroxide solution, but the photocatalyst particles are not restricted thereto as long as they exhibit photocatalytic functions. Examples include $TiO_2$, $ZnO$, $WO_3$, $SnO_2$, $SrTiO_3$, $CdS$, $CdSe$, $GaP$, $CdTe$, $Bi_2O_3$, $Fe_2O_3$, and the like. $TiO_2$ is proven to be most suitable in terms of its reactivity, durability, safety, etc. There is a rutile type and an anatase type in the crystalline structure of $TiO_2$, with the use of the anatase type having higher photocatalytic effects being desirable.

Upon irradiating an ultraviolet beam at approximately 390 nm corresponding to the band gap of the anatase type $TiO_2$, it is excited to form electrons and positive holes in the interior of the anatase type $TiO_2$. The produced electrons and positive holes penetrate the hydrophilic substance film and are reacted with oxygen and water present on the surface of the hydrophilic substance film to thereby produce superoxide anions ($O^{2-}$) and hydro-radicals (.OH). The produced $O^{2-}$ and .OH have strong oxidation power, and are reacted with the organic substances etc. 24 adhered onto the openings to oxidatively decompose and remove the organic substances etc. 24. Consequently, this prevents the decreasing of the hydrophilicity. When any other type photocatalyst particles are used, they are excited by a light corresponding to the band gap of the photocatalyst, and effects similar to those of the anatase type $TiO_2$ are exhibited.

In the present invention, the titanium peroxide solution can be used so as to form a film having a thickness of 40 nm, which is treated at a temperature ranging from normal room temperature to 200° C., whereby a photocatalyzer film comprising the photocatalyst particles supported in the amorphous $TiO_2$ can be formed. The thickness of the photocatalyzer film is preferably in the range of from 40 to 200 nm from the viewpoint of coloration due to the interference colors.

In the present invention, the hydrophilic substance film is formed so that at least the surface thereof becomes porous. The hydrophilic substance film is preferably formed from a material having a high hydrophilicity. The hydrophilic substance film can be formed in a porous state with a coating solution containing a hydrophilic substance by applying the coating solution through an application method such as spin coating, dip coating, spray coating, roll coating, or flow coating. It is also possible to form a hydrophilic substance film such as $SiO_2$ in a porous state by using a PVD method such as sputtering or vacuum deposition.

The materials for the hydrophilic substances which can be used are, for example, metal oxides such as $SiO_2$ and $Al_2O_3$ which are difficult to be photocatalytically decomposed. These metal oxides, which have hydrophilic OH groups on the surface thereof, generally exhibit hydrophilicity. According to our experiments, the best hydrophilicity can be obtained from $SiO_2$.

In the present invention, by setting the thickness of the hydrophilic substance film at 100 nm or smaller, the electrons and positive poles produced on the photocatalyzer film can be reacted well with the oxygen and water present on the surface of the hydrophilic substance film. From the viewpoint of the prevention of defects, the thickness of the hydrophilic substance film is preferably not less than 10 nm. From the viewpoint of maintaining the anti-fog property at the time when no ultraviolet ray is exposed, the thickness of the hydrophilic substance film is preferably in the range of from 10 to 100 nm.

Next, preferred embodiments of the anti-fog element according to the present invention will be described.

Figure 1:
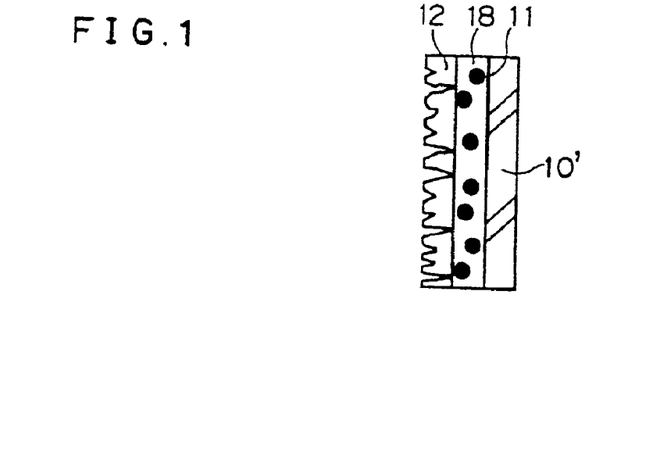
FIG. 1 is a partially cross-sectional view showing one embodiment of the present invention.

FIG. 1 shows an anti-fog element comprising a substrate 10', a photocatalyzer film 18 formed on the substrate 10' by utilizing a titanium peroxide solution with the photocatalyst particle dispersed therein, and a hydrophilic substance film 12 further formed thereon. When the titanium peroxide solution is formed into a film and treated at a temperature of from normal room temperature to 200° C., an amorphous $TiO_2$ film is obtained. Subsequently, a solution comprising the photocatalyst particles dispersed in the titanium peroxide solution is used to form a film, which is treated at a temperature of from normal room temperature to 200° C., whereupon a photocatalyzer film 18 comprising the photocatalyst particles 11 supported in the amorphous $TiO_2$ can be obtained. In this case, the photocatalyst particles serve as the photocatalyzer film.

Figure 2:
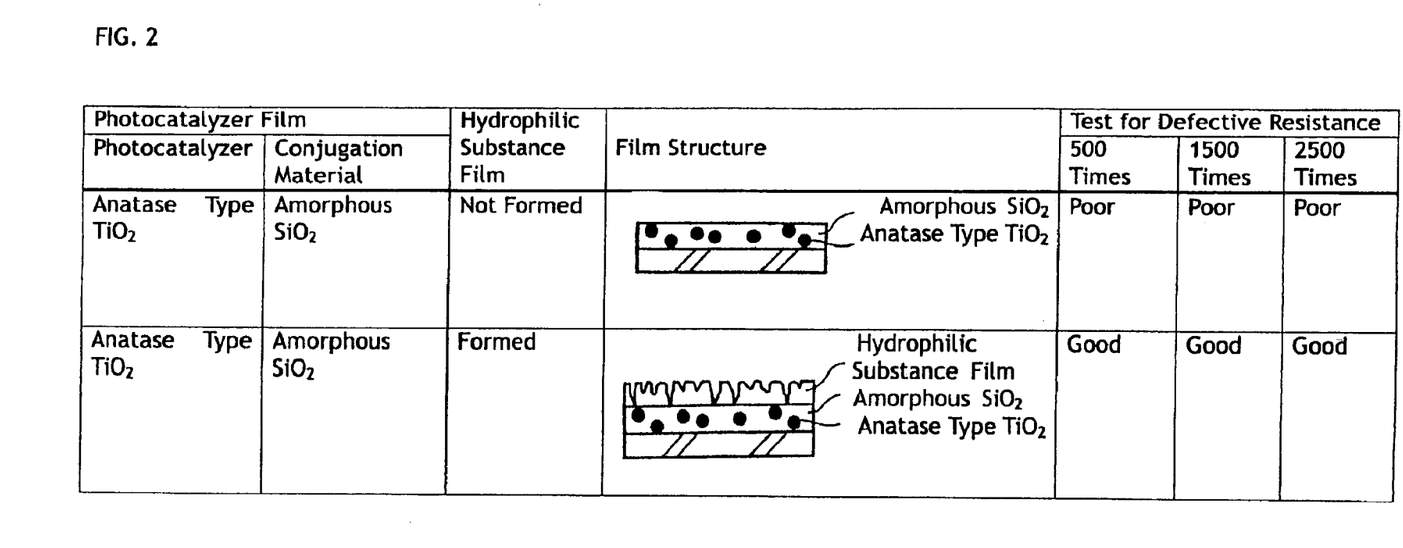
FIG. 2 shows the results of a test of defection of films.

As an anti-fog element which can be formed at a low temperature of from normal room temperature to 150° C., an anti-fog element can be mentioned, in which a solution of an anatase type $TiO_2$ fine particles dispersed in an amorphous silica such as tetraalkoxysilane, silanol or polysiloxane is used to form a film. The comparison of the defective resistance of this anti-fog element with that of the anti-fog element of the present invention was carried out. The results are shown in FIG. 2. Evaluations were carried out by wiping the film backward and forward 500 times, 1,500 times, and 2500 times, and observing the presence or absence of defects on the appearance of the film. While the former anti-fog element has been found to have defects, the anti-fog element formed according to the present invention has been found to have no defect.

Although details of the reasons are not known, it can be considered that since the former anti-fog element has the anatase type $TiO_2$ fine particles supported in the silica film only by the adhesion force between them, the $TiO_2$ fine particles are easily removed from the surface of the film by wiping and the defects occur due to the $TiO_2$ fine particles. On the other hand, it can be considered that since the surface is covered with the $SiO_2$ film in the anti-fog element according to the present invention, the anatase type $TiO_2$ in the amorphous $TiO_2$ is never removed and, thus, the anti-fog element of the present invention has a high defective resistance. When the covering with SiO2 is not carried out, the anti-fog element has been found to be defected as in the former anti-fog element.

Figure 3:
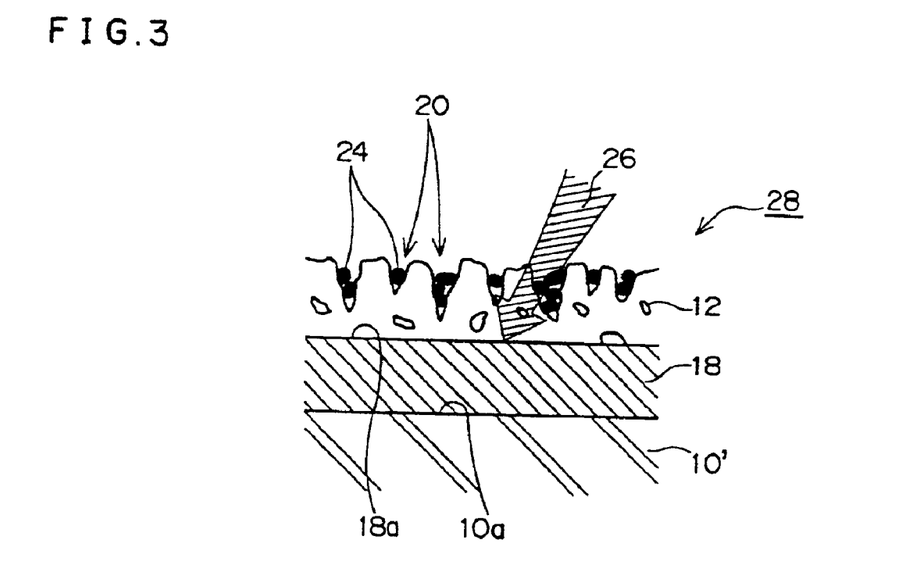
FIG. 3 is an explanatory view illustrating an anti-fog function through a porous hydrophilic substance film and a function of decomposing organic substances, etc. through a photocatalyzer film.

According to the configuration shown in FIG. 1, since the hydrophilic substance film 12 residing at the surface is formed in a porous state as shown in the partially enlarged cross-sectional view of FIG. 3, the anti-fog element has enhanced surface wettability, exhibits hydrophilicity, and thus, spreads out adhered water droplets in a thin film state, exhibiting an anti-fog effect. Consequently, applying the anti-fog element to an automobile outer mirror, a bathroom mirror, automobile window, windowpane, or the like, it becomes difficult for the water droplets to be adhered into a globular form and, thus, a much better view can be obtained. When organic substances etc. 24 including organic substances such as wax and organic substances in the atmosphere and $NO_x$ enter into an openings 20, a ray 26 of light such as sunlight or other light (such as ultraviolet ray) penetrates the hydrophilic substance, is radiated on the photocatalyzer film 18 to optically excite the photocatalytic particles within the photocatalyzer film 18. This optical excitation produces a pair of electrons and positive holes within the photocatalyzer film 18. The produced electrons and positive holes penetrate the hydrophilic substance film 12 and are reacted with oxygen and water present on the surface of the hydrophilic substance film 12 to thereby produce superoxide anions ($O^{2-}$) and hydroxy radicals (.OH). The produced $O^{2-}$ and .OH have strong oxidation power, and are reacted with the organic substances etc. 24 adhered onto the openings 20 to oxdatively decompose and remove the organic substances etc. 24. Consequently, this prevents the decreasing of the hydrophilicity, making it possible to maintain the anti-fog property over a prolonged period of time.

It is noted that a good photocatalytic reaction can be provided if the openings of the pores of the porous hydrophilic substance film are configured to be pierced through to the surface of the photocatalyzer film so that the organic substances and $NO_x$ entering into the openings of the pores come directly into contact with the photocatalyzer film. However, in the case where the hydrophilic substance film is $SiO_2$, even if the openings of the pores are not pierced through to the surface of the photocatalyzer film (i.e., the openings are blocked on the way to the surface of the photocatalyzer film), since the light (in the case of $TiO_2$, mainly ultraviolet ray) penetrates the transparent, porous hydrophilic substance film, and since the electrons and positive holes produced on the photocatalyzer film can also penetrate the porous hydrophilic substance film if the film is thin, the organic substances and $NO_x$ entering into the openings of the pores can be decomposed and removed by the photocatalyst reaction.

Figure 4:
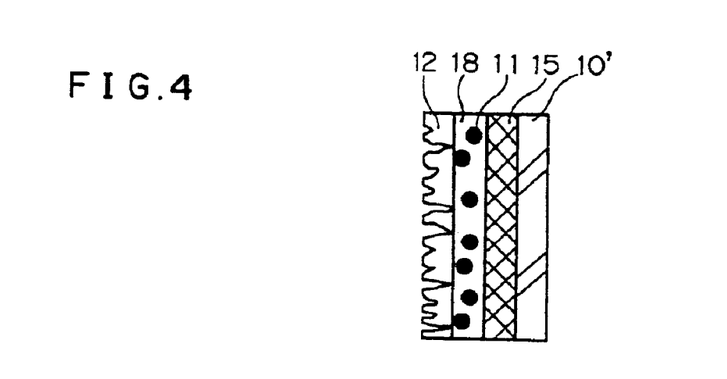
FIGS. 4 and 5 are partially cross-sectional views each illustrating another embodiment of the preset invention.

FIG. 4 shows a drawing in which an intermediate film 15 is formed between the surface of the substrate 10' and the photocatalyzer film 18. An example of the intermediate film includes a silicone thin film in the case where the substrate is based on an organic material. This film is a protective film so that the substrate does not undergo any damage due to the photocatalytic function of the photocatalyzer film. In addition, in the case where the substrate is based on a soda lime glass, which would involves a heat treatment stage at a high temperature, an $SiO_2$ film serving as a film for preventing the diffusion of alkali can be exemplified.

Figure 5:
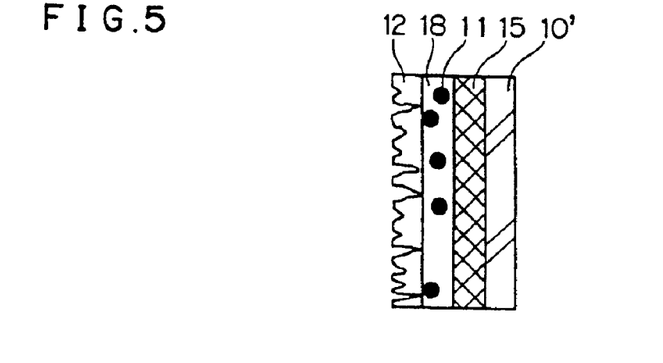

FIG. 5 shows a drawing in which an intermediate film 15 comprising a metal reflecting film is formed between the surface of the substrate 10' and the photocatalyzer film to configure an anti-fog mirror.

While, the films are formed on one surface in all of the embodiments shown in FIGS. 1 to 5, the present invention is not restricted thereto.

EXAMPLES

Various Examples of this invention will now be described, where Examples 1 to 5 (FIGS. 6 to 10) are examples in which the present invention is applied to an automobile outer mirror (FIGS. 7 to 10 are shown with the mirror body being omitted), Examples 6 to 8 (FIGS. 11 to 13) are examples in which the present invention is applied to an automobile window (the same is the case when the present invention is applied to window panes of a building), and Example 9 (FIG. 14) is an example in which the present invention is applied to a bathroom mirror.

| Film forming conditions in Examples are as follows: | |
|---|---|
| Substrate: | Soda Lime Glass |
| Photocatalyzer Film: | |
| Material: | Trade Name TAK Available from TAO Co., Ltd. (Titanium peroxide solution containing anatase type $TiO_2$ fine particles) |
| Film Forming Temperature: | 100° C. |
| Film Thickness: | 75 nm |
| Hydrophilic Substance Film: | |
| Material: | Trade Name of N-103X available from COLCOAT CO., LTD. ($SiO_2$ coating agent) |
| Film Forming Temperature: | 25° C. |
| Film Thickness: | 20 nm |

Figure 6:
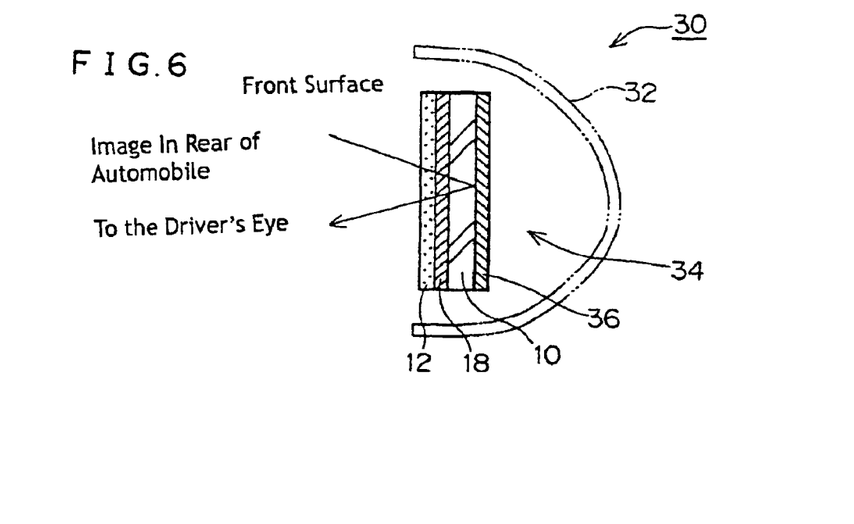
FIGS. 6 to 14 are cross-sectional views each illustrating an example where the present invention is applied to a wide variety of uses.

(1) Example 1 (FIG. 6)

An automobile outer mirror 30 is configured as a door mirror or a fender mirror. The outer mirror 30 possesses a mirror body 32 having a mirror assembly 34 accommodated therein. The mirror assembly 34 is composed of a transparent glass substrate 10 having a $TiO_2$ film 18 and a porous $SiO_2$ film 12 formed on the front surface of the glass substrate 10, and a reflecting film 36 such as Cr or Al film formed on the rear surface of the glass substrate 10. The image behind the automobile penetrates through the $SiO_2$ film 12, the $TiO_2$ film 18 and the transparent glass substrate 10, and is reflected upon the reflecting film 36 to be led to the driver's eye via a reverse path. Organic substances etc., entering into the openings of the pores of the $SiO_2$ film 12 and then adhered therein are decomposed by the oxidation-reduction reaction cause by the photocatalytic reaction on the $TiO_2$ film 18.

Figure 7:
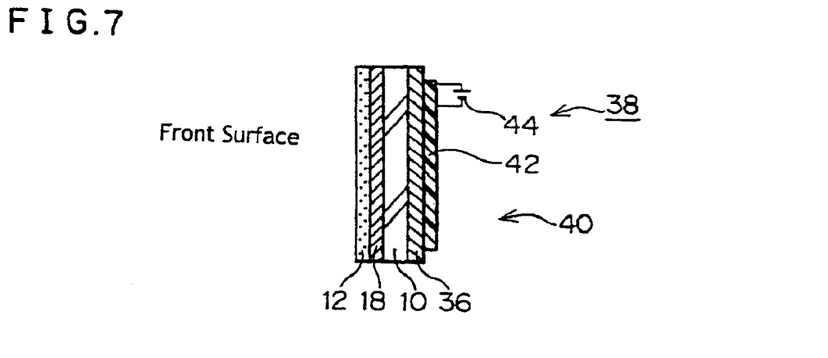

(2) Example 2 (FIG. 7)

A mirror assembly 40 of an automobile outer mirror 30 is composed of a transparent glass substrate 10 having a $TiO_2$ film 18 and a porous $SiO_2$ film 12 formed on the front surface of the glass substrate 10, and a reflecting film 36 such as Cr or Al film formed on the rear surface of the glass substrate 10. Over substantially the entire area of the rear surface of the reflecting film 36, a panel-like heater 42 is bonded by mean of an adhesive or a bonding agent. Current is supplied to the panel-like heater from a power source 44. If the panel-like heater 40 comprises, for example, a PTC (positive characteristic thermister) panel heater, it can be directly driven by an automobile battery and, thus, no temperature control circuit or the like is required. The PTC panel heater is composed of a polymeric sheet-like heating element having PCT characteristics imparted thereto (for example, electrically conductive resin in which electrodes made of e.g. silver or copper are provided and which is laminated by a PET film) and the like. The water droplets spread over the $SiO_2$ film in a thin film state are heated by the panel-like heater 42, whereby the water droplets can be effectively removed (evaporated).

Figure 8:
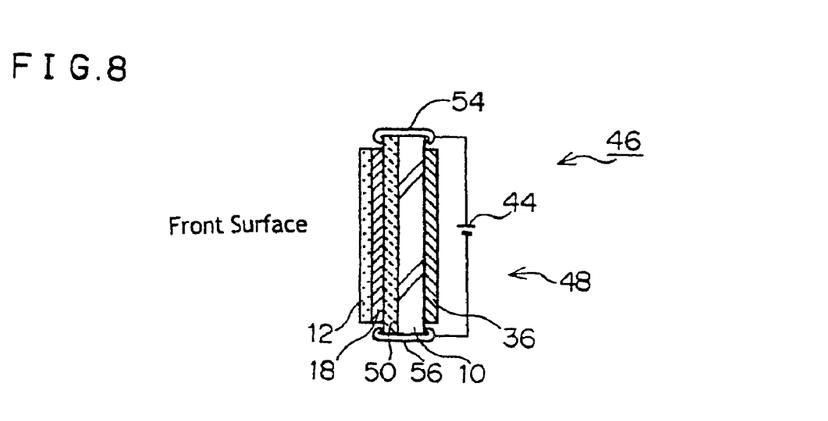

(3) Example 3 (FIG. 8)

A mirror assembly 48 of an automobile outer mirror 46 is composed of a transparent glass substrate 10 having a transparent electrode film 50 such as ITO as a heating element, a $TiO_2$ film 18 and a porous $SiO_2$ film 12 formed on the front surface of the glass substrate 10 in this order, and a reflecting film 36 such as Cr or Al film formed on the rear surface of the glass substrate 10. Clip electrodes 54 and 56 are mounted in the upper and lower portions of the laminated transparent glass substrate 10 and the transparent electrode film 50. By supplying current from a power source 44 to the transparent electrode film 50, the transparent electrode 50 is heated to effectively remove the water droplets spread over the $SiO_2$ film 12 in a thin film state.

Figure 9:
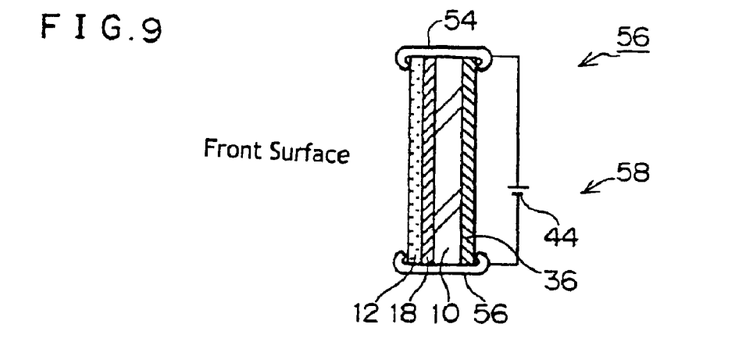

(4) Example 4 (FIG. 9)

A mirror assembly 58 of an automobile outer mirror 56 is composed of a transparent glass substrate 10 having a $TiO_2$ film 18 and a porous $SiO_2$ film 12 formed on the front surface of the glass substrate 10, and a reflecting film 36 such as Cr or Al film formed on the rear surface of the glass substrate 10. Clip electrodes 54 and 56 are mounted in the upper and lower portions of the laminated transparent glass substrate 10 and the transparent electrode film 50. By supplying current from a power source 44 to the reflecting film 36 (also serving as a heating element), the reflecting film 36 is heated to effectively remove the water droplets spread over the $SiO_2$ film 12 in a thin film state.

Figure 10:
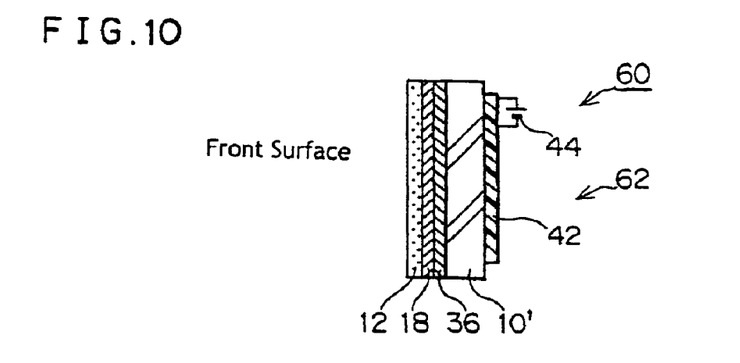

(5) Example 5 (FIG. 10)

An automobile outer mirror 60 is configured as a surface mirror (a reflecting film is formed on the front surface of the substrate member). A mirror assembly 62 is composed of a glass substrate 10' (not required to be transparent) having a reflecting film 36 such as Cr or Al film, a $TiO_2$ film, and a porous $SiO_2$ film 12 formed on the front surface of the glass substrate 10' in this order, and a panel-like heater 42 adhered or bonded onto the rear surface of the glass substrate 10'. The panel-like heater 42 is heat by supplying current from a power source 42 to the panel-like heater 42. Similar to FIG. 9, instead of the panel-like heater 42, the reflecting film 36 itself may be used as the heating element.

Figure 11:
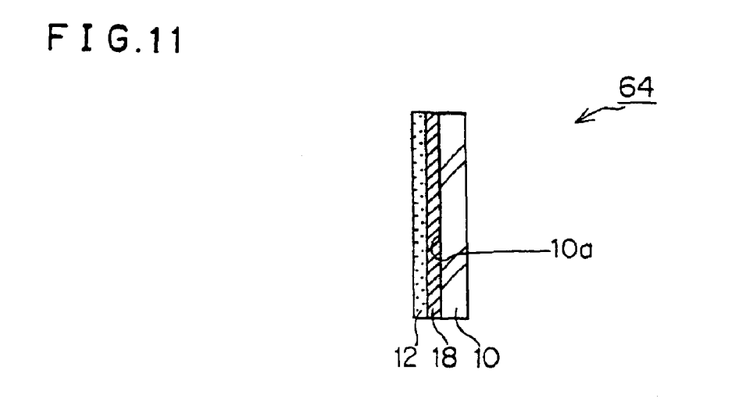

(6) Example 6 (FIG. 11)

An automobile window 64 is composed of a transparent glass substrate 10 which totally makes up the widow glass main body, having a $TiO_2$ film and a porous $SiO_2$ film 12 formed on one surface (either outside surface of the automobile or inside surface of the automobile) thereof in a totally transparent state (with or without color). If the $TiO_2$ film and the porous $SiO_2$ film 12 are formed on the outside surface of the automobile, an effect for removing raindrops etc. can be obtained. If they are on the inside surface of the automobile, an effect for removing water droplets such as due to condensed water can be obtained.

Figure 12:
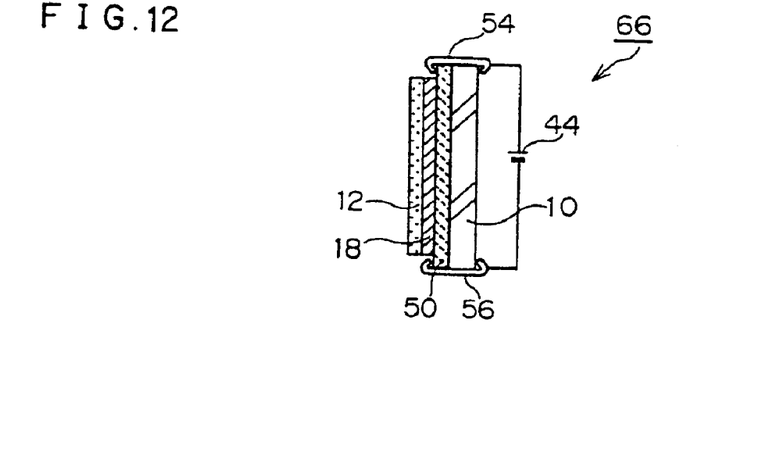

(7) Example 7 (FIG. 12)

An automobile vehicle window 64 is composed of a transparent glass substrate 10a which totally makes up the widow glass main body, having a transparent electrode film 50 such as ITO, a $TiO_2$ film and a porous $SiO_2$ film 12 formed on one surface (either outside surface of the automobile or inside surface of the automobile) thereof in this order in a totally transparent state. Clip electrodes 54 and 56 are mounted in the upper and lower portions of the laminated transparent glass substrate 10a and the transparent electrode film 50. By supplying current from a power source 44 to the transparent electrode film 50, the transparent electrode 50 is heated to effectively remove the water droplets spread over the $SiO_2$ film 12 in a thin film state.

Figure 13:
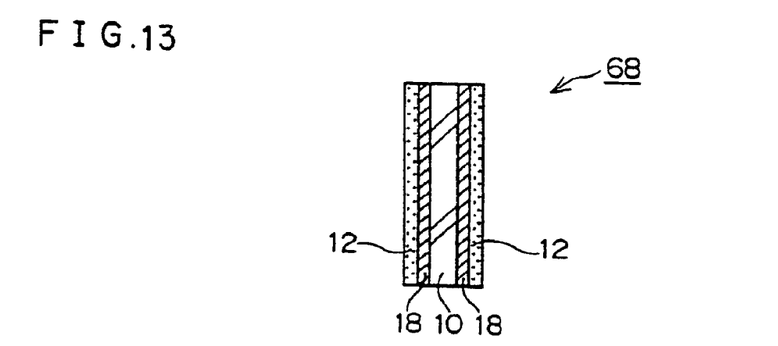

(8) Example 8 (FIG. 13)

An automobile window 68 is composed of a transparent glass substrate 10 having $TiO_2$ films and porous $SiO_2$ films 12 formed on both surfaces thereof and exhibits anti-fog property on both surfaces. A transparent electrode film can be disposed between the surface of the transparent glass substrate 10 and the $TiO_2$ film 18.

Figure 14:
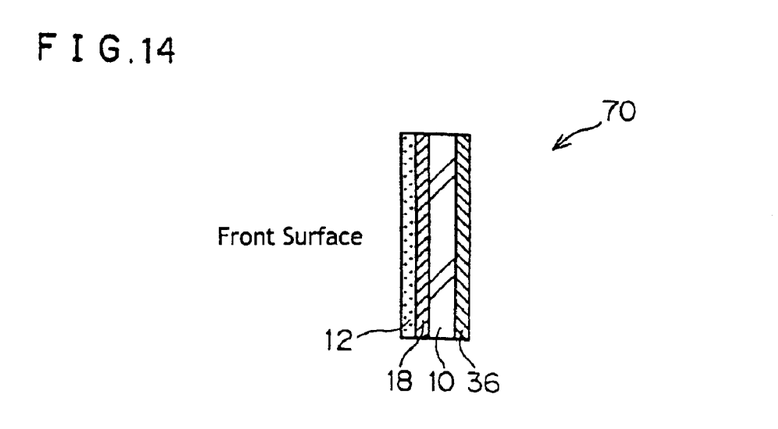

(9) Example 9 (FIG. 14)

A bathroom mirror 70 is composed of a transparent glass substrate 10 having a $TiO_2$ film 18 and a porous $SiO_2$ film 12 formed on the front surface of the glass substrate 10, and a reflecting film 36 such as Cr or Al film formed on the rear surface of the glass substrate 10. A heating element (such as panel heat, e.g., PTC) can be disposed on the rear surface of the reflecting film 36, or a transparent electrode film can be disposed between the surface of the transparent glass substrate 10 and the $TiO_2$ film 18.

While the substrate member is composed of the glass substrate in the examples described above, the substrate may be based on any material other than glass (such as a plastic or metal).

INDUSTRIAL APPLICABILITY

The anti-fog element according to this invention can be configured as an automobile window or a windowpane for a building by using a transparent material such as a transparent glass substrate as a material of the substrate. In this case, a photocatalytic reaction occurs with a sunbeam. Since the photocatalyzer ($TiO_2$) has a function of absorbing a ultraviolet light, an effect of cutting a ray of ultraviolet can also be obtained. If the anti-fog film is formed on the outside surface of the room (automobile), an effect for removing raindrops etc. can be obtained, while if it is formed on the inside surface of the room (automobile), an effect for removing water droplets such condensed water can be obtained. Anti-fog elements can be formed on both of the inside and outside surfaces.

By forming a reflecting film on the substrate, the anti-fog element of this invention can be configured as an automobile outer mirror or a bathroom mirror. In the case of the automobile outer mirror, a photocatalytic reaction occurs with sunlight. In the case of the bathroom mirror, a photocatalytic reaction occurs with an ultraviolet ray irradiated from a fluorescent light or such.

What is claimed is:

1. An anti-fog element comprising a substrate, a photocatalyzer layer formed on the surface of the substrate, and a porous hydrophilic film formed on the surface of the photocatalyzer layer, wherein a coating agent comprising photocatalyst particles dispersed in a titanium peroxide solution obtained by causing titanium hydroxide (orthotitanic acid) gel to act with hydrogen peroxide is used as a starting material for the photocatalyzer layer, and wherein the starting material for the photocatalyzer layer is applied to the substrate and then is heated between room temperature and no more than 200° C. to form the photocatalyzer layer.

2. The anti-fog element as claimed in claim 1, further comprising an intermediate film between the surface of said substrate and said photocatalyzer layer.

3. The anti-fog element as claimed in claim 1, wherein said porous hydrophilic substance film is a transparent inorganic oxide film.

4. The anti-fog element as claimed in claim 1, wherein the anti-fog element is a transparent automobile window.

5. The anti-fog element as claimed in claim 1, wherein said substrate is transparent and which further comprises a reflecting film formed on the rear surface of the transparent substrate to form an anti-fog mirror.

6. The anti-fog element as claimed in claim 5, wherein the anti-fog element is configured as an automobile outer mirror.

7. The anti-fog element as claimed in claim 1 comprising a reflecting film formed on the rear surface of the substrate, a transparent photocatalyzer layer formed on the surface of the substrate, and a transparent porous hydrophilic substance film formed on the surface of the photocatalyzer layer to form an anti-fog mirror having a hydrophilic surface.

8. A process for forming an anti-fog element comprising forming a photocatalyzer layer on the surface of a substrate and forming a porous hydrophilic film on the surface of the photocatalyzer layer, wherein a coating agent comprising photocatalyst particles dispersed in a titanium peroxide solution obtained by causing titanium hydroxide (orthotitanic acid) gel to act with hydrogen peroxide is used as a starting material for the photocatalyzer layer, wherein the starting material for the photocatalyzer layer is applied to the substrate and then is heated between room temperature and no more than 200° C. to form the photocatalyzer layer.

* * * * *